March 12, 1957 L. F. GUIMBRETIERE ET AL 2,784,905
ANALYSERS FOR THE AUTOMATIC EXECUTION OF CUMULATIVE CURVES
SHOWING THE ALGEBRAIC VARIATIONS OF
A STATISTICAL DISTRIBUTION
Filed Feb. 6, 1953 3 Sheets-Sheet 1
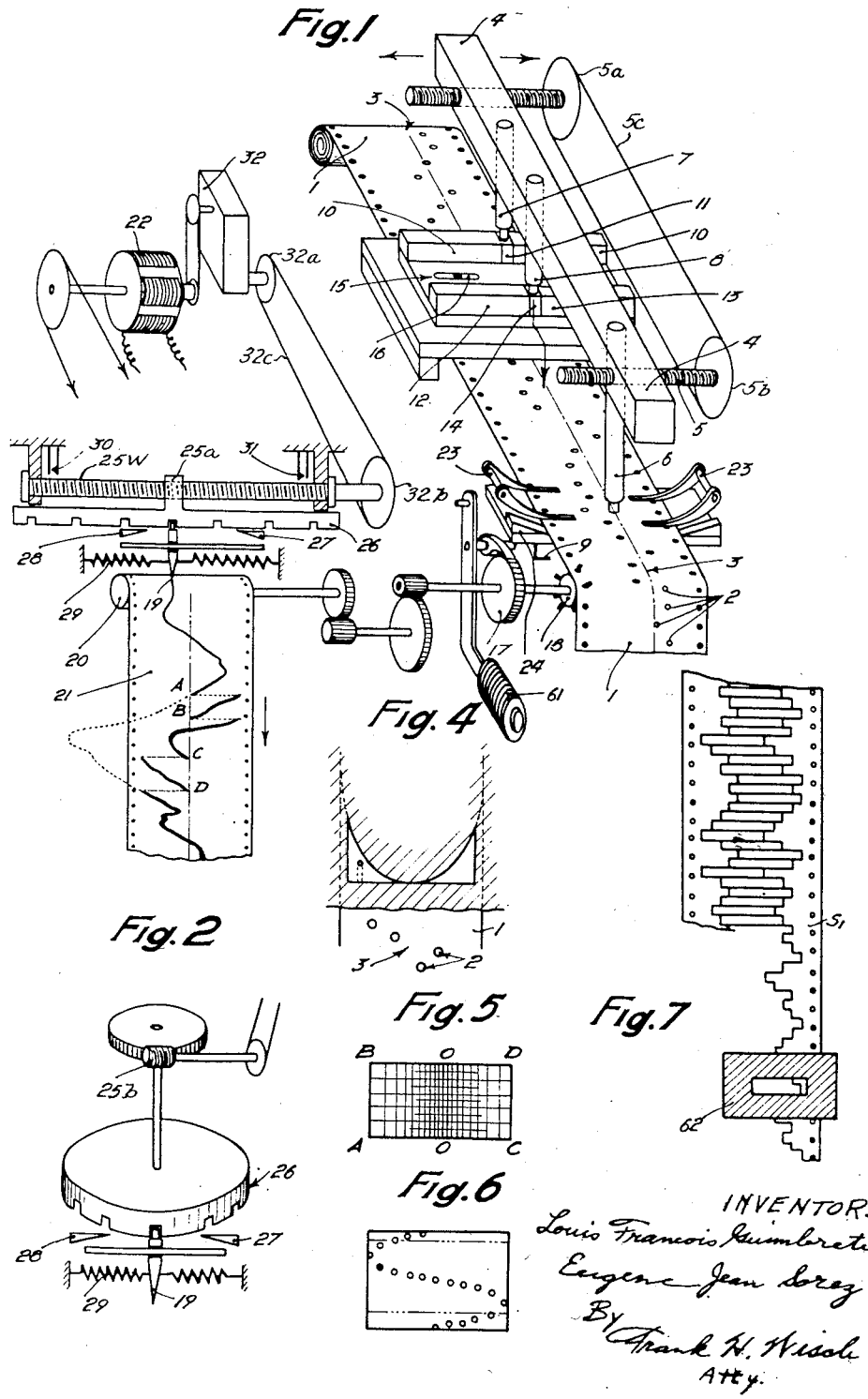

United States Patent Office 2,784,905
Patented Mar. 12, 1957

2,784,905

ANALYSERS FOR THE AUTOMATIC EXECUTION OF CUMULATIVE CURVES SHOWING THE ALGEBRAIC VARIATIONS OF A STATISTICAL DISTRIBUTION

Louis François Guimbretiere, Montfaucon-sur-Moine, and Eugène Jean Sorez, Roubaix, France Application February 6, 1953, Serial No. 335,568

13 Claims. (Cl. 235—61)

The present application, which is a continuation in part of lapsed patent application Ser. No. 794,026 filed December 26, 1947, now abandoned has for its object an apparatus to convert recordings in the form of perforations which have been displaced from a starting line a distance proportional to the magnitude of the function recorded, in a cumulative graph of the algebraic distances of the perforations to an average line.

The apparatus according to our invention comprises a scanning device with suitable arrangements that may be electric, optic, mechanical or otherwise which measures in magnitude and in sign the distance between each perforation of the diagram and the average lines, suitable arrangements that form the algebraic total of their readings on a receiver the abscissae of which are proportional at each moment to the algebraic total of the variations with reference to an average line, this algebraic total being recorded on a graph.

By way of a non limiting example of our invention we will describe hereinafter embodiments of automatic analysers executed in accordance with our present invention. In accompanying drawings illustrating said embodiments:

Fig. 1 is a general view of a preferred mechanical form of execution of our invention.

Fig. 2 is a perspective view of a modification of a detail of Fig. 1.

Fig. 4 is a plane view of a modification of the luminous slot of Fig. 3.

Fig. 5 is a plane view of a screen to replace the luminous slot of Fig. 3.

Fig. 6 is an explanatory graph.

Fig. 7 is a plane view of a modification of the device of Fig. 3.

Figure 3:
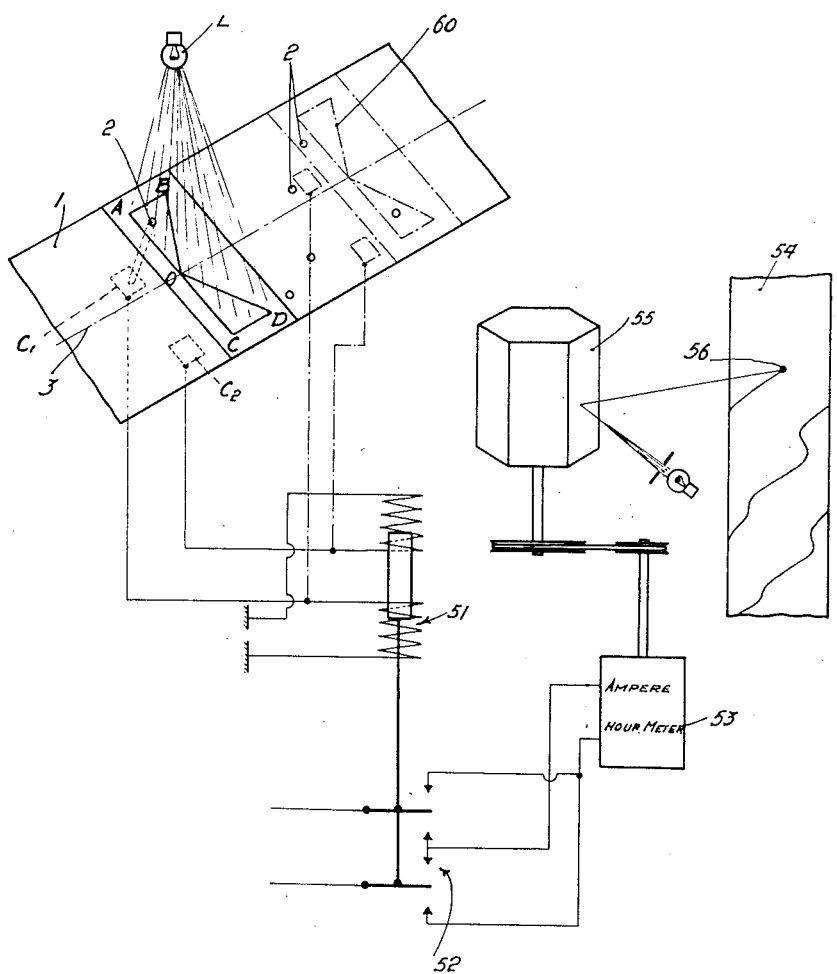
Fig. 3 is a general view of a second optic form of execution of our invention.

As shown in Fig. 1, a curve analysing apparatus is executed as follows: the chart strip 1 provided with the different perforations 2 the average of which is given out by the longitudinal line 3 is introduced underneath the scanning carriage 4 assuming a reciprocating movement in a direction perpendicular to the general axis of the chart 1. The reciprocating movement of the carriage is obtained for instance by means of a screw provided with threads 5 of opposite pitches or any other suitable means.

The carriage 4 is provided with three electric sliding contact pieces or feelers 6—7 and 8 and each of these contact pieces moves over a corresponding electric track so as to execute the following operations:

(a) The first contact piece 6 is separated from its track 9 through the chart paper 1. As the paper is made of insulating material, no current can pass between the contact piece 6 and the track 9, that is electrically conductive throughout its length otherwise than at its ends that project beyond the graph, except when the contact piece 6 registers with a perforation 2. Suitable electromechanical devices such as a reversing mercury switch 34 (Fig. 8) rigid with a lever 35 adapted to rock suddenly at the end of the movement of the carriage 4, are designed in a manner such that the electric contact at 6—9 may be operative only when the carriage 4 moves in the direction leading from a perforation 2 towards the line of averages 3. On the contrary, the contact is inoperative when the carriage moves in a direction from the average line outwardly towards a perforation. This holds true whatever may be the algebraic sign of the variation. This contact between the contact piece 6 and the track 9 through a perforation 2 releases, by example, by closing through a relay 36 controlling a mercury switch 38 connected to terminals 38a and 38b and carried by a rocking lever 39 the feeding line of an electromagnetic clutch 22, the means measuring the distance between said perforations and the average line and the beginning of the graphical accumulation of said measure with the previously recorded total.

(b) The second feeler or contact-piece 7 moves over a track 10 that is insulating throughout its length except for the contact piece 11 carried by it, that is as short as possible. The apparatus is adjusted in a manner such that the contact through said contact pieces 7 and 11 may close at the moment where the feeler or contact piece 6 passes above the general average line 3 of the perforations. When the carriage 4 brings the feeler 7 into contact with the contact piece 11, an electric circuit by example a circuit feeding an antagonist winding 37 acting on the rocking lever 39 of the mercury switch 38 is closed that produces the disconnection of the clutch 22 and the interruption of the recording that has precedingly been started by the cooperation of the feeler 6 with the track 9. The result of the cooperation of the two feelers 6 and 7 consists therefore in a measuring of the absolute value of the distances of these perforations with reference to the general average line 3 of these perforations and the recording thereof in their accumulative form. In order that this accumulation may be performed accurately, it is necessary that each variation with reference to average as measured may be given a suitable algebraic sign and this is the part entrusted to the feeler or contact piece 8.

(c) The feeler 8 is associated with a track 12—13 that is electrically conductive throughout almost its entire length except for a medial insulating part 14 that separates the two conductive tracks 12 and 13. The apparatus is adjusted in a manner such that the feeler 8 may be in contact with the half track 12 or the half track 13 according as to whether the feeler 8 lies on the side of the positive variations or of the negative variations with reference to the general average line 3.

The half tracks 12 and 13 fed electrically each in their turn by the feeler 8 serve for giving an algebraic sign to the measure made of each variation. This sign appears materially by reason of the presence of the electromagnetic clutch 22 that rotates in a predetermined direction during the scanning of the negative variations and in the opposite direction during the scanning of the positive variations. The rotation in both directions is obtained by a reversing mercury switch 33, fast with the mercury switch 34, said reversing switch coupling the clutch 22 with one or the other of the driving plates 49 and 50 which rotate in opposite directions. The control of the cumulative recorder 19 depends on the operation of said clutch 22.

The system including the two last mentioned tracks 10—11 and 12—13—14 is carried on a platform 15 that may be adjusted by means of sliders 16 in a manner such that the elements 11 and 14 may be conveniently adjusted whatever may be the position of the average line 3 on the graph 1. An accurate micrometric adjustment may be advantageously associated with said arrangement.

The operation of the apparatus is as follows:

At each reciprocation of this scanning device 4, a variation is measured as to amplitude and to sign between a perforation 2 and the average line of the perforations 3. Between two successive reciprocations of the scanning carriage 4, the chart 1 progresses through one step under the action of a suitable mechanism such as ratchet wheel 17 and sprocket drum 18. Said ratchet wheel is controlled through an electromagnet 61 that is energized through the closing of the electric switch 11 which closing is operated once for each reciprocation of the cooperating carriage 4. Thus each reciprocation of the carriage 4 provides for the forward movement of the perforated strip 1 by one step. Each measure thus detected through its perforation is thus exploited as disclosed.

The variations with reference to average, thus measured and accumulated, produce a displacement of the stylus 19 of the recording means 20. The graph 21 on the latter progresses through one step at each reciprocation of the scanning carriage 4 under the action for instance of the ratchet wheel 17. The electromagnetic clutch 22, controlled by the set of feeler contacts 6, 7 and 8, provides for the accumulation of the variations in a variations accumulating member, of which various embodiments will be described hereunder, and which drives the recording stylus 19.

During the scanning of the paper chart 1 by the feeler 6 it is necessary to energetically hold the paper fast in order to avoid any error during the measuring of the variations. This is obtained by means of two clamps 23 that hold the chart 1 stationary with reference to the track 9.

At the end of a scanning operation, a suitable arrangement opens the clamps 23 so as to release the chart 1 which is shifted through one step through the operation of the ratchet wheel 17. During the displacement of the chart paper 1 at the end of each scanning, the feeler 6 is released with reference to the conductive track 9 by an insulating slope 24 over which said feeler rises at the end of each scanning stroke; or any other equivalent device may be used instead of the arrangement described.

Figure 8:
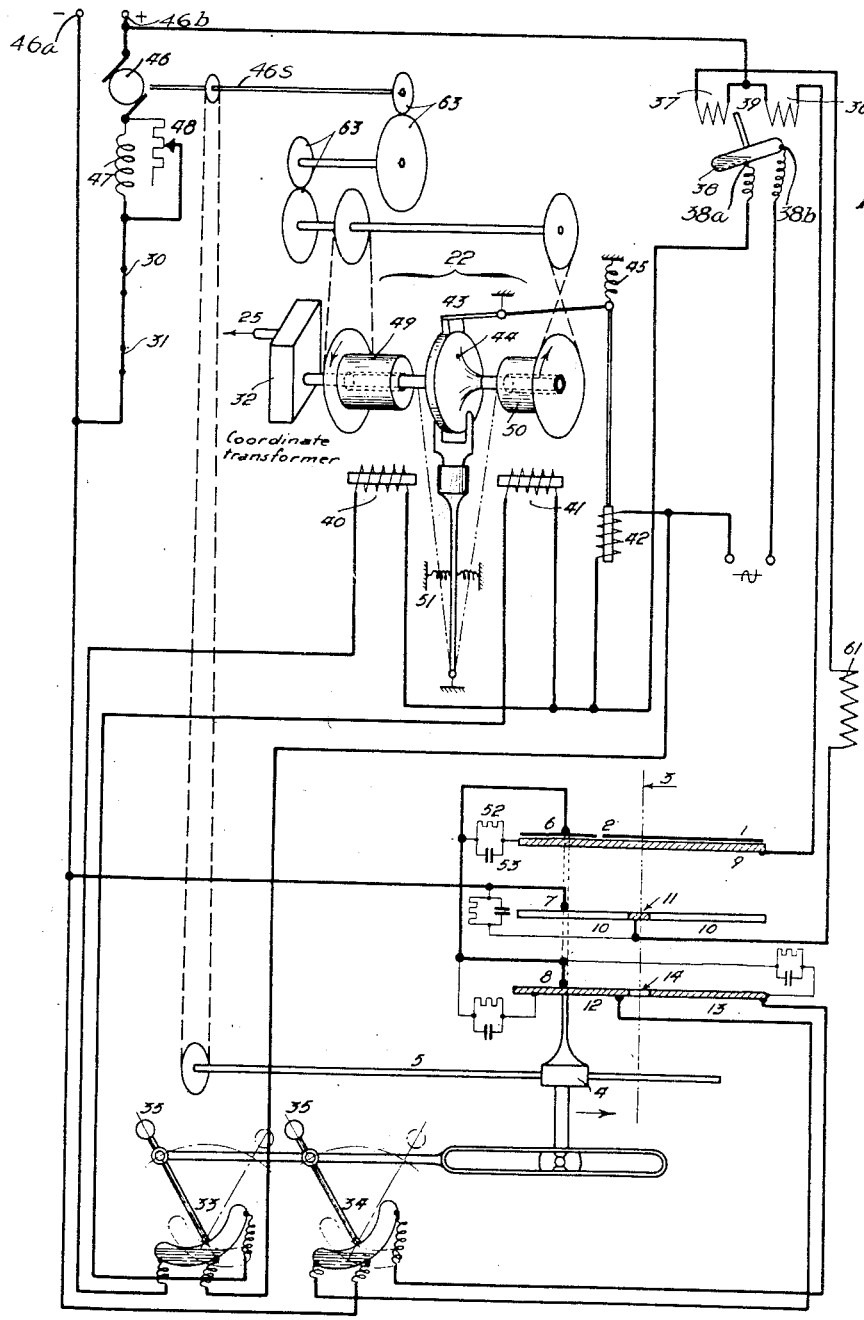
Fig. 8 is a wiring diagram of the apparatus of Fig. 1.

In the wiring diagram of Fig. 8, that groups the different parts of the apparatus, and in which the circuit is shown connected to terminals 46a and 46b, 1 designates again the perforated strip of paper submitted to analysis and provided with perforations at 2; 3 is the line corresponding to the average line of perforations; 4 designates the scanning-carriage of the apparatus that is driven alternatingly towards the right and towards the left through the double pitch screw 5 that is driven by pulleys 5a and 5b provided with a belt 5c, pulley 5a being mounted on a shaft 46s which is driven by the motor 46. Said carriage is provided as disclosed with electric contact-pieces 6, 7 and 8, the first of which is associated with an electrically conductive track 9 located underneath the paper strip. The insulating track 10 carries a conductive contact-piece 11 adapted to cooperate with the contact-piece 7, and 12 and 13 are the two conductive half-tracks separated by an insulating strip 14 and adapted to cooperate with the contact piece 8. It is possible to associate with these different contact-pieces the conventional spark-damping means constituted e. g. by resistances 52 and condensers 53.

33 and 34 designate two reversing mercury switches rigid with a common lever 35 adapted to rock suddenly. This sudden rocking of the lever 35 is produced mechanically or electrically by the movement of the scanning carriage 4 at either end of its travel whereby during the left-to-right movement of the carriage 4 the reversing switches 33 and 34 remain in the position for which they are rocked leftwards as illustrated in Fig. 8 while, when the carriage returns towards the left, the reversing switches 33 and 34 are in the position for which they are rocked rightwards with the mercury vessels in the position illustrated in dot-and-dash lines.

The electro-magnets 36 and 37 control the operation of the mercury switch 38 that is carried by a rocking lever 39; said switch 38 retains its position, whether open or closed, even when the energization of the electromagnet 36 or 37 that has brought it into such a position is at an end. The switch 38 is closed when the electromagnet 36 is energized and is opened again through energization of 37. The electromagnet 40 controls the driving of the coordinate transformer 32 and by the variations accumulating member 25 of the stylus 19 during a positive shift corresponding to a perforation 2 the elongation of which is higher than the average elongation 3. 41 designates a further electromagnet controlling the movement of the coordinate transformer 32 and, by the variations accumulating member 25 of the stylus 19 during a negative shift corresponding to a perforation 2 the elongation of which is less than the average elongation 3. 42 is an electromagnet that releases the brake 43 with reference to the disc 44 of the clutch 22 while either electromagnet 40 or 41 is energized, that is during the integration on the cumulative graph 21 of a positive or negative shift of the diagram on the perforated belt 1. During the inoperative periods of the electromagnets 40 and 41, the electromagnet 42 is also inoperative and the disc 44 of the clutch 22 is locked by the spring 45 in its braking position.

The disc 44 controls the movement of the accumulator device 25. It may assume any one of the three following positions:

1. Disconnection with reference to the driving plates 49 and 50, said disc 44 being brought into its medial position through the springs 51 and being held fast by the brake 43 under the action of the spring 45 in the position illustrated in Fig. 8.

2. Disengagement of the disc with reference to the brake 43 through the operation of the electromagnet 42 and engagement on the left hand side with the driving plate 49 through the operation of the electromagnet 40 in the case of a positive shift.

3. Disengagement with reference to the brake 43 through the operation of the electromagnet 42 and re-engagement on the right hand side with the other driving plate 50 through the operation of the electromagnet 41 in the case of a negative shift.

The motor providing for the general drive of the analyser includes an armature 46 and a field piece 47 which latter is controlled through the rheostat 48.

30 and 31, shown in closed position in Fig. 8, are the safety switches inserted in the field circuit and controlled at the ends of the travel of the variations accumulating member 25.

63 designates the wheels of an adjustable change speedgear through which the motor controls either component of the clutch 22 for driving the coordinate transformer 32 through the clutch disc 44.

The operation of the system is as follows: the insulating strip 14 and the conductive contact piece 11 are located in register with the line 3, forming the average location of the perforations on the strip 1 submitted to analysis.

Supposing the scanning carriage 4 moves from left to right and a perforation 2 is to be found on the left of the line of averages 3 as shown in Fig. 8, the reversing switches 33 and 34 are in their rocked position illustrated that is directed towards the left when the carriage begins its movement, while the switch 38 is also in its open position illustrated for which it is rocked leftwardly, and all the electric circuits are inoperative except that feeding the motor 46.

Thus the feeler 6, when it registers with a perforation 2 provides a contact between the track 9 and the half-track 12 that is energized through the agency of the reversing switch 34. The electromagnet 36 is energized so that the switch 38 closes its circuit and the electromagnets 40 and 42 are both energized, of which 42 releases the brake 43 and 40 provides for the engagement of the disc 44 to make the clutch 22 operate in the desired direction.

As the carriage 4 continues its movement towards the right, the feeler 7 arrives into register with the contact piece 11 adjustably positioned on the line of averages 3. This energizes the electromagnet 37 which in its turn opens the circuit controlled by the switch 38 so that the energization of 40 and 42 is at an end. The electromagnet 40 being no longer energized, the disc 44 is no longer driven into rotation and as 42 is no longer energized, the brake 43 locks the disc 44 under the action of the spring 45; the displacement of the stylus 19 by the coordinate transformer 32 and the variations accumulating member 25 stops therefore instantaneously.

When the carriage has reached the right hand end of its stroke, the carriage 4 controls the rocking lever 35 and reverses the positions of the reversing members 33 and 34 after which said carriage begins its return movement towards the left.

When the feeler 6 passes again over a perforation 2 nothing more occurs as 33 and 34 are in their position for which they are rocked towards the right and no current flows through the half track 12.

When the carriage 4 has returned towards the left hand side of its stroke, it rocks the members 33 and 34 towards the left, and a further cycle of operation begins over again.

When entering a negative shift into the total instead of a positive one, the operation is similar to that described hereinabove: the electromagnet 41 operates instead of the electromagnet 40 and the disc 44 is driven along in a direction opposed to that referred to precedingly.

It may happen that the accumulation of certain variations makes the recording stylus 19 pass outside the limits of the diagram or chart 21. To avoid such a drawback, said recording stylus 19 is driven by the variations accumulating member 25, which is constituted by a worm 25w rotated by the coordinate transformer 32 coacting with pulleys 32a and 32b, and belt 32c, and cooperating with a threaded nut 25a through a suitable arrangement such for instance and as shown in Fig. 1 as a rack 26, cams 27 and 28 acting at the end of the stroke and a return spring 29. Each time the recording stylus 19 reaches either of the edges of the chart 21, the cam 27 or 28 releases transiently the stylus 19 that is no longer submitted to the action of the variation accumulating member 25. Under the action of the spring 29 or the like equivalent device, the stylus 19 returns suddenly to zero and engages a further notch in the rack 26. The recording of the accumulated curve is not interrupted and said curve shows only a shift as shown at A, B, C, D of which the interpretation is obvious.

When the variation accumulating member 25 arrives at the end of its stroke, e. g. the threaded nut at the end of the worm, the contacts 30 and 31 provide on one hand for a stopping of the apparatus and on the other hand for the actuation of an alarm signal.

The operator has then the possibility of shifting the recording stylus 19 through a predetermined amount and prosecuting then the operation that is under way.

This latter drawback may moreover be avoided by giving the rack 26 (Fig. 2) an endless circular shape said rack being rotated by a worm gear 25b. In this case the accumulation of the variations is unlimited. Suitable metering means may totalise algebraically the number of shifts in the accumulated curve.

Different details of execution may be designed in a manner such that the recording stylus 19 instead of accumulating magnitudes that are proportional to the variation of each measure with reference to the general average, accumulates magnitudes that are proportional to any function of such variations.

Obviously the arrangements, details and sizes of the apparatus disclosed may vary without modifying its principle. In particular the arrangement of the feelers on the scanning carriage, the manner of displacing the carriage, the means for adjusting the feelers, the means for transforming the coordinates and the like components of the apparatus may be modified as desired.

Furthermore, the operation of the track defining the passage of the scanning feeler across the average line and that of the track indicating the algebraic sign of the variations with reference to average may be replaced by simple electric contacts that open and close simultaneously through a suitable simple arrangement, controlled for instance by the passage of the scanning carriage itself.

Fig. 3 shows a second form of execution of a curve analysing apparatus.

The paper chart 1 provided with all the perforations 2, the general average of which is defined by the line 3, is placed above a transparent slot OABOCD illuminated by a suitable arrangement such as lamp L. The point O of the slot is located above the general average line 3 of the perforations. Under such conditions, one of the halves OAB for instance of the luminous slot corresponds to the positive variations while the other half OCD corresponds to the negative.

The perforated paper 1 is caused to move at a uniform speed in a manner such that the average line 3 may remain constantly in register with the point O. Each perforation 2 as it moves under the luminous slot OABOCD allows luminous energy to pass on one or the other of the two photocells $C_1$—$C_2$, $C_1$ corresponding to the positive variations and $C_2$ to the negative variations in amounts proportional on one hand to the duration of passage of the perforations above the slot and on the other hand to the light intensity along the path followed by the perforation in front of the slot.

If the paper chart 1 is supposed to be opaque, it will be readily understood that this arrangement allows an integration of the variations of all the perforations 2 with reference to their general average line 3 as a function of the law governing both the distribution of light along the slot and the geometrical shape of the slot.

If the slot is uniformly illuminated, the action of each perforation 2 in the general accumulation of the variations depends only on the geometrical shape of the slot. Thus a luminous slot comprising two symmetrical triangles (Fig. 3) provides a totalization of the variations in proportion with their value.

A luminous slot assuming a parabola shape as shown in Fig. 4 provides for the totalization of the variations in proportion with the square of their value and many other shapes may be designed in accordance with the functions to be obtained.

If the slot has a constant breadth, the action of each perforation in the general accumulation of the variations depends solely on the distribution of the light intensity along the slot. The introduction of a screen of variable opacity as shown in Fig. 5 or any other similar suitable arrangement allows also the automatic translation of any desired law of integration of the variations.

If the slot has a variable breadth and a variable opacity the action of each perforation depends simultaneously on both said parameters.

The variations with reference to the average with a positive and negative sign being thus transformed into amounts of electrical energy, their totalization may be executed in the following manner:

The two halves of the luminous slot are capped by corresponding cameras obscuras containing a complete apparatus adapted to integrate the luminous energies filtrated by the slot OABOCD and the perforations of the chart paper. For instance said apparatus may include a photo-cell in each camera obscura associated if required with a suitable amplifier. For a suitable adjustment, the amounts of electricity provided by the two cells conform with the law of integration selected for the accumulation of the variations.

The two electric circuits corresponding respectively to the accumulation of positive variations and negative variations are associated inside a device adapted to produce their algebraic total at each moment.

Said device may be constituted either by an amperehour meter with two differential windings or by a double flux meter with two differential windings or by any other suitable system. In Fig. 3 the maximum length AB or CD along the strip 3 of the slots OAB, OCD being less than the path between the two perforations 2, only one of the cells is used to control a relay 51 which make, by a two directions contactor 52, an electric current pass in one or the other direction within the winding of an ampere hour meter 53.

The curve of these accumulated variations may be obtained for instance by a photographic arrangement 54 recording the deflections of a luminous beam reflected by a mirror 55 rotating through an angle proportional to the algebraic sum of the two amounts of electricity received by the differential ampere hour meter or by the differential flux meter, the mirror 55 being coupled to the rotation with the equipment of the ampere hour meter.

In particular the use of the ampere hour meter with two differential windings allows inter alia the following advantages to be obtained:

The meter may be provided with a polygonal mirror 55 ensuring automatically the return of the spot 56 to zero when the accumulation of important variations causes said spot to move out of the recording field of the accumulator apparatus as a matter of fact, the reflection of the luminous spot is executed first on one surface of the rotary mirror, then on the next surface thereof and so on, which leads to a shifting of the line drawn, which shifting is apparent when the accumulated curve is being inspected.

It should be remarked that the luminous device that has just been described is capable of use at a considerable speed of displacement of the perforated chart.

The optic execution of the curve analysing apparatus is capable of modifications in execution that are extremely fruitful. In particular, it is possible to eliminate from the accumulation of variations all periodic functions incorporated in the curve undergoing analysis. We have described hereinafter by way of non limiting examples three methods of elimination of such periodic functions.

According to a first method, when the optimum breadth of the luminous slot is less than the pitch between two perforations, light never passes through more than one perforation at a time. A second luminous slot 60 is provided that is associated with an electric apparatus identical with and located at a certain distance from the former in the direction of the perforated chart to be examined. If the distance between the two luminous slots is equal to one half the wave length of the periodical phenomenon predominating in the distribution of the perforations, it is apparent that the periodical variations compensate one another two by two as they appear symmetrically and simultaneously in the two luminous slots and as they have opposite signs they cancel one another at every moment.

According to a second method, instead of using two identical slots such as OABOCD, we may, for detecting and wiping out the periodical phenomenon, shift with reference to one another the two half slots OAB and OCD through a distance equal one half of the wave length to be considered.

According to a third method, and in the case of a slot of uniform breadth, we may give this breadth a value such that several perforations sweep same simultaneously.

If all the perforations registering simultaneously with a slot are distributed symmetrically in accordance with a periodical distribution, it is apparent that their total action is zero. It is sufficient to this purpose that the breadth of the luminous slot may be equal to the wave lenth or periodicity of the periodical phenomenon to be considered (Fig. 6).

We will now describe a third form of execution of curve analysing apparatuses.

When the statistic measures the distribution of which is to be investigated are recorded as linear perforations and no longer under the form of graph holes, the graph obtained appears as cut out into a plurality of strips (Fig. 7).

One of these strips such as $S_1$ may be used in the optic analyser 62 with a luminous slot. Under such conditions, the luminous flow is proportional to the amplitude of the variation recorded.

A triangular slot allows the accumulation of variations that are proportional to the square of their value and so on.

By opposing to the variable photo electric current thus produced a constant current having a value equal to the average value of this variable current, it is possible to obtain an electric accumulator of variation that is similar to those described with reference to the second form of execution.

We have described hereinabove a certain number of optic systems that allow the elimination of the periodic functions incorporated in the statistical distribution of the variations. These arrangements may be transformed into mechanical forms of execution of the invention associated with the example of Fig. 1. To this purpose, it is possible to provide as follows, the following disclosure being given out solely by way of example in a non binding sense.

The paper chart passes in succession underneath two scanning carriages similar to that discosed with reference to Fig. 1 and each of which is associated with a variation accumulating arrangement.

The two accumulator arrangements operate simultaneously and independently of one another so as to totalize the corresponding accumulated variations on a single receiver through the agency for instance of a sun-and-planet gear.

Under such conditions when the parts of the chart 1 submitted simultaneously to the analysis of two scanning carriages correspond to symmetrical parts of the same periodical phenomenon, said periodical phenomenon disappears from the final accumulation graph.

Obviously the above described arrangements, details and relative sizes may be modified to a wide extent within the scope of accompanying claims.

What we claim is:

1. An apparatus to convert recordings in the form of perforations in a strip which have been displaced from a starting line a distance proportional to the successive measures made of a varying magnitude into a cumulative curve of the algebraic distances of said perforations to an average line, said apparatus comprising means for making the strip progress longitudinally a scanning device that measures in magnitude and in sign the distance between each perforation of the diagram and the average line, and means for adding functions of the so measured distances and means for recording the successive sums obtained.

2. An apparatus to convert recordings in the form of perforations in a strip which have been displaced from a starting line a distance proportional to the successive measures made of a varying magnitude into a cumulative curve of the algebraic distances of said perforations to an average line, said apparatus comprising a carriage, means whereby said carriage is reciprocated transversally over the perforated strip means for making the perforated strip progress longitudinally after each reciprocation of the carriage, means carried by said carriage to detect the successive perforations means to measure algebraically the distances from the average line to the perforations, means for adding functions of the so measured distances and means for recording the successive sums obtained.

3. An apparatus to convert recordings in the form of perforations in a strip which have been displaced from a starting line a distance proportional to the successive measures made of a varying magnitude into a cumulative curve of the algebraic distances of said perforations to an average line, said apparatus comprising a carriage, means whereby said carriage is reciprocated transversally over the perforated strip, means for making the perforated strip progress longitudinally after each reciprocation of the carriage, three electrically conductive feelers carried by the carriage and extending towards the perforated strip, a set of three transversal tracks on the support of which one is located on the side of the strip opposed to the carriage and facing the first feeler which rubs on the strip above said path and cooperates electrically with said feeler through the perforations of the strip, the second track lying between the strip and the carriage, including a narrow conductive element and two insulating sections to either side thereof and adapted to electrically cooperate with the second feeler on the carriage and the third track being arranged between the strip and the carriage including a narrow insulating element and two conductive elements of opposite polarities adapted to cooperate with the third feeler, means for shifting the second and third track transversally with reference to the strip to make the conductive and insulating elements on said tracks register with the average line of the strip, means to measure algebraically the distance from the average line to the perforations, means whereby the contact of the first feeler with the first track through the perforations in its path towards the average line releases the measuring means, means whereby the passage of the second feeler over the conductive element of the cooperating track locks the measuring means again, means for adding the measures made, means whereby the passage of the third feeler over one of the conductive sections of the cooperating track provides for the measures being made to be added by last mentioned means with the sign corresponding to the polarity of the conductive section over which the third feeler is moving and means for recording the sums obtained by the adding means.

4. An apparatus to convert recording in the form of perforations in a strip which have been displaced from a starting line a distance proportional to the successive measures made of a varying magnitude into a cumulative curve of the algebraic distances of said perforations to an average line, said apparatus comprising three electrically conductive feelers carried by a carriage and extending towards the perforated strip, a set of three transversal tracks on the support, of which one is located on the side of the strip opposed to the carriage and facing the first feeler which rubs on the strip above said path and cooperate electrically with said feeler through the perforations of the strip the second track lying between the strip and the carriage, including a narrow conductive element and two insulating sections to either side thereof and adapted to electrically cooperate with the second feeler on the carriage and the third track being arranged between the strip and the carriage including a narrow insulating element and two conductive elements of opposite polarities adapted to cooperate with the third feeler, means for shifting the second and third track transversally with reference to the strip to make the conductive and insulating elements on said tracks register with the average line of the strip, distance measuring means, means for adding the measures made, recording means thereof, a control for said adding and recording means, an electromagnetic clutch inserted in said control means and means whereby the contact of the first feeler with its track through a perforation in the direction of the average line energizes said electromagnet, means whereby the passage of the second feeler over its cooperating conductive element de-energizes said electromagnet and means whereby the direction of rotation of said clutch is defined by the passage of the third feeler over either section of its cooperating conductive track.

5. In an apparatus as claimed in claim 2, the provision of means adapted to allow the return of the totalizing means to zero each time it passes beyond a predetermined value.

6. An apparatus to convert recordings in the form of perforations in a strip which have been displaced from a starting line a distance proportional to the successive measures made of a varying magnitude into a cumulative curve of the algebraic distances of said perforations to an average line, said apparatus comprising a longitudinally stationary member provided with a transversally symmetrical slot lying transversally over the strip, means for shifting the slotted member transversally to make the point of symmetry of the slot register with the medial line of the strip, means for illuminating in series the strip and the slot, means for driving the perforated strip at a uniform speed, means sensitive to the intensity of the light passing through the successive perforations and through the slot in proportion with the time of passage of a perforation across the slot and with the luminous intensity of the portion of light rays registering with the passages of the perforation considered, means for totalizing the light intensities detected by last mentioned light sensitive means, the addition of the successive light intensities being made with the sign corresponding to the position of the perforation considered with reference to the medial line on the strip, and means for recording to totals obtained.

7. An apparatus to convert recordings in the form of perforations in a strip which have been displaced from a starting line a distance proportional to the successive measures made of a varying magnitude into a cumulative curve of the algebraic distances of said perforations to an average line, said apparatus comprising a longitudinally stationary member provided with a transversally symmetrical slot lying transversally over the strip, means for shifting the slotted member transversally to make the point of symmetry of the slot register with the medial line of the strip, means for illuminating in series the strip and the slot, means for driving the perforated strip at a uniform speed, photocells sensitive to the intensity of the light passing through the successive perforations and through the slot in proportion with the time of passage of a perforation across the slot and with the luminous intensity of the portion of light rays registering with the passage of the perforation considered, one photocell cooperating with each half of the slot to either side of the medial line and a meter including two differential windings the currents flowing through which are controlled by the photocells to either side of the average line and means for recording the indications of said meter.

8. An apparatus to convert recordings in the form of perforations in a strip which have been displaced from a starting line a distance proportional to the successive measures made of a varying magnitude, into a cumulative curve of the algebraic distances of said perforations to an average line said apparatus comprising a longitudinally stationary member provided with a transversally symmetrical slot lying transversally over the strip, means for shifting the slotted member transversally to make the point of symmetry of the slot register with the medial line of the strip, means for illuminating in series the strip and the slot, means for driving the perforated strip at a uniform speed, photo-cells sensitive to the intensity of the light passing through the successive perforations and through the slot in proportion with the time of passage of a perforation across the slot and with the luminous intensity of the portion of light rays registering with the passage of the perforation considered one photocell cooperating with each half of the slot to either side of the medial line, a meter including two differential windings the currents flowing through which are controlled by the photocells to either side of the average line, a polygonal mirror rotating around its axis under the control of the meter, means to project a light ray on said mirror, a sensitive surface, means to form with the light ray reflected on said mirror a spot on said sensitive surface and means for recording photographically the movements of said spot by displacing said sensitive surface.

9. In an apparatus as claimed in claim 2, the provision of means for associating the indications given out by two perforations longitudinally distant by a predetermined amount for eliminating the indications corresponding to substantially sinusoidal phenomena occurring at periodicity equal to twice the longitudinal distance considered.

10. In an apparatus as claimed in claim 2, the provision of means for associating the recording through all the perforations within a predetermined longitudinal distance for eliminating thereby the indications corresponding to substantially sinusoidal phenomena having a periodicity corresponding to the distance considered.

11. An apparatus to convert recordings in the form of perforations in a strip which have been displaced from a starting line a distance proportional to the successive measures made of a varying magnitude into a cumulative curve of the algebraic distance of said perforations to an average line, said apparatus comprising two longitudinally stationary members each provided with a transversally symmetrical slot lying transversally over the strip, means for shifting the slotted member transversally to make the point of symmetry of the slot register with the medial line of the strip, means for illuminating in series the strip and the slot of each member, means for driving the perforated strip at a uniform speed, means sensitive to the intensity of the light passing through the successive perforations and through the slot for each member in proportion with the time of passage of a perforation across the slot and with the luminous intensity of the portion of light rays registering with the passage of the perforation considered, the longitudinal distance between the slots in the two members being equal to one half the distance corresponding to the periodicity of a given substantially sinusoidal phenomenon the action of which is to be eliminated, means for totalizing the light intensities detected by last mentioned light sensitive means, the addition of the successive light intensities being made with the sign corresponding to the position of the perforation considered with reference to the medial line on the strip, and means for recording the totals obtained.

12. An apparatus to convert recordings in the form of perforations in a strip which have been displaced from a starting line a distance proportional to the successive measures made of a varying magnitude into a cumulative curve of the algebraic distance of said perforations to an average line, said apparatus comprising a longitudinally stationary member provided with two symmetrical half-slots separated longitudinally through a distance equal to one half the distance corresponding to the periodicity of an interfering phenomenon the action of which is to be eliminated, means for shifting the member transversally to make the two slot halves lie symmetrically of the medial line of the strip, means for illuminating in series the strip and each half slot, means for driving the perforated strip at a uniform speed, means sensitive to the intensity of the light passing through the successive perforations and through each half slot in proportion with the time of passage of a perforation across the half slot and with the luminous intensity of the portion of light rays registering with the passage of the perforation considered, means for totalizing the light intensities detected by last mentioned light sensitive means, the addition of the successive light intensities being made with the sign corresponding to the position of the perforation considered with reference to the medial line on the strip, and means for recording the totals obtained.

13. An apparatus to convert recordings in the form of perforations in a strip which have been displaced from a starting line a distance proportional to the successive measures made of a varying magnitude into a cumulative curve of the algebraic distances of said perforations to an average line, said apparatus comprising a longitudinally stationary member provided with a transversally symmetrical slot lying transversally over the strip, means for shifting the slotted member transversally to make the point of symmetry of the slot register with the medial line of the strip, means for illuminating in series the strip and the slot, means for driving the perforated strip at a uniform speed, means sensitive to the intensity of the light passing through the successive perforations and through the slot in proportion with the time of passage of a perforation across the slot and with the luminous intensity of the portion of light rays registering with the passage of the perforation considered, a circuit fed by said light sensitive means with a current having an intensity proportional to a function of the length of the slot-shaped perforations, means for feeding a constant current in antagonism with last mentioned current, means for adding the current pulses obtained through the difference of the currents as obtained at the execution of a measure through each perforation, and recording means for the sums obtained.

References Cited in the file of this patent

UNITED STATES PATENTS 2,088,297    Koenig _____ July 27, 1937